United States Patent
Wang et al.

(10) Patent No.: US 11,190,013 B2
(45) Date of Patent: Nov. 30, 2021

(54) SYSTEM AND CONTROL METHOD OF ALL-DC POWER SUPPLY AND STORAGE FOR BUILDING

(71) Applicant: TSINGHUA UNIVERSITY, Beijing (CN)

(72) Inventors: Fulin Wang, Beijing (CN); Yi Jiang, Beijing (CN)

(73) Assignee: TSINGHUA UNIVERSITY, Beijing (CN)

(\*) Notice: Subject to any disclaimer, the term of this patent is extended or adjusted under 35 U.S.C. 154(b) by 0 days.

(21) Appl. No.: 16/961,644

(22) PCT Filed: Oct. 12, 2019

(86) PCT No.: PCT/CN2019/110786
§ 371 (c)(1),
(2) Date: Jul. 10, 2020

(87) PCT Pub. No.: WO2020/211307
PCT Pub. Date: Oct. 22, 2020

(65) Prior Publication Data
US 2021/0175708 A1    Jun. 10, 2021

(30) Foreign Application Priority Data

Apr. 16, 2019  (CN) .......................... 201910302285.7

(51) Int. Cl.
*H02J 1/12* (2006.01)
*H02S 40/38* (2014.01)
(Continued)

(52) U.S. Cl.
CPC .................. *H02J 1/12* (2013.01); *H02J 1/14* (2013.01); *H02J 7/34* (2013.01); *H02J 7/35* (2013.01);
(Continued)

(58) Field of Classification Search
CPC ........ H02J 3/381; H02J 2300/24; H02J 3/383; H02J 3/386; H02J 2300/20; H02J 2300/28;
(Continued)

(56) References Cited

U.S. PATENT DOCUMENTS 9,831,715 B2\*  11/2017  Zeuch .................... H02H 3/087
2012/0326516 A1\*  12/2012  Gurunathan .............. H02J 1/00
                                                    307/72
(Continued)

FOREIGN PATENT DOCUMENTS

CN        203151120 U      8/2013
CN        207868804 U      9/2018
(Continued)

OTHER PUBLICATIONS

International Search Report issued by the China National Intellectual Property Administration (ISA/CN) in connection to International Application No. PCT/CN2019/110786, dated Jan. 15, 2020.

*Primary Examiner* — Ryan Johnson
(74) *Attorney, Agent, or Firm* — Carter, DeLuca & Farrell LLP; George Likourezos

(57) ABSTRACT

The present invention discloses a system and control method of all-DC power supply and storage for a building. The system includes a renewable energy power generation apparatus, a mains grid system, a first DC/DC conversion apparatus, an AC/DC conversion apparatus, a first voltage DC bus, a first energy storage apparatus, and a first charge-discharge conversion apparatus. The first DC/DC conversion apparatus is configured to convert DC voltage generated by the renewable energy power generation apparatus to voltage of the first voltage DC bus. The AC/DC conversion apparatus is configured to convert AC power from the mains grid system to DC power. The first charge-discharge conversion apparatus is configured to control charge/discharge
(Continued)

of the first energy storage apparatus. The first voltage DC bus is connected to a first electrical device and configured to power the first electrical device.

11 Claims, 4 Drawing Sheets

(51) Int. Cl.
*H02J 1/14* (2006.01)
*H02J 7/35* (2006.01)
*H02J 7/34* (2006.01)

(52) U.S. Cl.
CPC .......... *H02S 40/38* (2014.12); *H02J 2300/24* (2020.01); *Y02B 10/10* (2013.01); *Y02E 10/50* (2013.01); *Y02E 70/30* (2013.01); *Y04S 10/123* (2013.01); *Y04S 10/14* (2013.01)

(58) Field of Classification Search
CPC .. H02J 3/382; H02J 7/0068; H02J 3/32; H02J 1/14; H02J 2310/12; H02J 2310/14; H02J 2310/64; Y02E 70/30; Y02E 60/10; Y02B 10/10; Y02B 10/30; Y04S 10/12; Y04S 10/123; Y04S 10/14

See application file for complete search history.

(56) References Cited

U.S. PATENT DOCUMENTS

| | | |
|---|---|---|
| 2013/0249298 A1 | 9/2013 | Dong et al. |
| 2018/0254632 A1* | 9/2018 | Elbsat .................. G06Q 50/06 |

FOREIGN PATENT DOCUMENTS

| | | | | |
|---|---|---|---|---|
| CN | 207884298 U | | 9/2018 | |
| CN | 109921409 A | | 6/2019 | |
| CN | 209448427 U | | 9/2019 | |
| KR | 20140093371 A | * | 7/2014 | |
| WO | WO-2012144357 A1 | * | 10/2012 | ................ H02J 3/32 |

* cited by examiner

SYSTEM AND CONTROL METHOD OF ALL-DC POWER SUPPLY AND STORAGE FOR BUILDING

This application claims the benefit of and priority to International Application No.: PCT/CN2019/110786, filed Oct. 12, 2019 which claims priority to Chinese Patent Application No. 201910302285.7, filed with the China National Intellectual Property Administration (CNIPA) on Apr. 16, 2019, the entire contents of each application are incorporated by reference herein.

TECHNICAL FIELD

The present invention relates to the field of power system technologies, and in particular, to a system and control method of all-DC power supply and storage for a building.

BACKGROUND

Currently, all buildings are supplied with alternating current (AC) power. However, almost all electrical devices, such as liquid crystal displays (LCDs), personal computers, direct current (DC) inverter air conditioners, and light-emitting diode (LED) lights, use DC power supplies. In AC power supply mode, each electrical device requires a voltage regulator and rectifier apparatus, which increases hardware costs, and AC-DC conversion causes power loss. In addition, with the rapid development of photovoltaic power generation technologies followed by reduced costs, an increasing number of buildings are equipped with apparatuses for utilizing renewable energy such as photovoltaic power. The photovoltaic power generation usually does not match the power consumption in buildings. Because of the difference between them, the renewable energy such as the photovoltaic power cannot be fully utilized.

SUMMARY

The objective of the present invention is to provide a system and control method of all-DC power supply and storage for a building. The present invention can improve power distribution efficiency and allow local renewable energy to be fully utilized.

To achieve the above purpose, the present invention provides the following technical solutions.

A system of DC power supply and storage for a building includes:

a renewable energy power generation apparatus, a mains grid system, a first DC/DC conversion apparatus, an AC/DC conversion apparatus, a first voltage DC bus, and a first power adjustment apparatus; where an input end of the first DC/DC conversion apparatus is connected to an output end of the renewable energy power generation apparatus, and an output end of the first DC/DC conversion apparatus is connected to the first voltage DC bus; and the first DC/DC conversion apparatus is configured to convert DC voltage generated by the renewable energy power generation apparatus into voltage of the first voltage DC bus;

an input end of the AC/DC conversion apparatus is connected to the mains grid system, an output end of the AC/DC conversion apparatus is connected to the first voltage DC bus; and the AC/DC conversion apparatus is configured to convert AC power from the mains grid system into DC power;

the first voltage DC bus is connected to a first electrical device and configured to power the first electrical device; and the first power adjustment apparatus is connected to the first voltage DC bus; the first power adjustment apparatus is configured to balance between power generation of the renewable energy power generation apparatus, power supply of the mains grid system, and power consumption of a first electrical device; the first power adjustment apparatus includes a first energy storage apparatus and a first charge-discharge apparatus; one end of the first charge-discharge conversion apparatus is connected to the first voltage DC bus, and the other end is connected to the first energy storage apparatus; and the first charge-discharge conversion apparatus is configured to control charge/discharge of the first energy storage apparatus.

Optionally, the system of DC power supply and storage for a building further includes:

a second DC/DC conversion apparatus, a second voltage DC bus, and a plurality of second power adjustment apparatuses;

an input end of the second DC/DC conversion apparatus is connected to the first voltage DC bus, an output end of the second DC/DC conversion apparatus is connected to the second voltage DC bus, and the second DC/DC conversion apparatus is configured to convert DC voltage;

the second voltage DC bus is connected to a second electrical device and configured to power the second electrical device; and rated voltage of the second electrical device is lower than rated voltage of the first electrical device; and the second power adjustment apparatus is connected to the second voltage DC bus; the second power adjustment apparatus is configured to balance between the power generation of the renewable energy power generation apparatus, the power supply of the mains grid system, the power consumption of the first electrical device, and power consumption of the second electrical device; the second power adjustment apparatus includes a second energy storage apparatus and a second charge-discharge conversion apparatus; an input end of the second charge-discharge conversion apparatus is connected to the second voltage DC bus, and an output end of the second charge-discharge conversion apparatus is connected to the second energy storage apparatus; and the second charge-discharge conversion apparatus is configured to control charge/discharge of the second energy storage apparatus.

Optionally, the first charge-discharge conversion apparatus includes a first switch, a second switch, a first step-up circuit, and a first step-down circuit; one end of the first switch is connected to the first voltage DC bus, the other end of the first switch is connected to one end of the first step-up circuit, and the other end of the first step-up circuit is connected to the first energy storage apparatus; and one end of the second switch is connected to the first voltage DC bus, the other end of the second switch is connected to one end of the first step-down circuit, and the other end of the first step-down circuit is connected to the first energy storage apparatus;

the second charge-discharge conversion apparatus includes a third switch, a fourth switch, a second step-up circuit, and a second step-down circuit; one end of the third switch is connected to the second voltage DC bus, the other end of the third switch is connected to one end of the second step-up circuit, and the other end of the second step-up circuit is connected to the second energy storage apparatus; and one end of the fourth switch is connected to the second voltage DC bus, the other end of the fourth switch is connected to one end of the second step-down circuit, and the other end of the second step-down circuit is connected to the second energy storage apparatus; and both the first step-up circuit and the second step-up circuit are boost circuits; and both the first step-down circuit and the second step-down circuit are buck circuits.

Optionally, both the first charge-discharge conversion apparatus and the second charge-discharge conversion apparatus are charge-discharge controllers.

Optionally, both the first energy storage apparatus and the second energy storage apparatus are batteries.

Optionally, there is one or more first power adjustment apparatuses; and when there are a plurality of first power adjustment apparatuses, the first power adjustment apparatuses are distributed inside the building based on building space and a position in which the first electrical device is arranged;

there is one or more second power adjustment apparatuses; and when there are a plurality of second power adjustment apparatuses, the second power adjustment apparatuses are distributed inside the building based on building space and positions in which the first electrical device and the second electrical device are arranged; and the renewable energy power generation apparatus is one or more of a photovoltaic power generation apparatus and a wind power generation apparatus.

The present invention further provides a control method of all-DC power supply and storage for a building, including:

obtaining power quota of a mains grid system, power generation of a renewable energy power generation apparatus, and power consumption of a first electrical device;

calculating charge/discharge power of a first energy storage apparatus based on the power quota of the mains grid system, the power generation of the renewable energy power generation apparatus, and the power consumption of the first electrical device; and adjusting the current direction and magnitude of the first energy storage apparatus based on the charge/discharge power of the first energy storage apparatus to achieve a preset control mode of a system of all-DC power supply and storage for a building.

Optionally, the control method of all-DC power supply and storage for a building further includes:

obtaining power consumption of a second electrical device;

calculating charge/discharge power of a second energy storage apparatus based on the power quota of the mains grid system, the power generation of the renewable energy power generation apparatus, the power consumption of the first electrical device, and the power consumption of the second electrical device; and adjusting the current direction and magnitude of the second energy storage apparatus based on the charge/discharge power of the second energy storage apparatus to achieve the preset control mode of the system of all-DC power supply and storage for a building.

Optionally, the charge/discharge power of the first energy storage apparatus is calculated based on the formula $P_b(t) = P_g(t) + P_{pv}(t) - P_{L1}(t)$, where $P_b(t)$ is the charge/discharge power of the first energy storage apparatus at moment t, $P_g(t)$ is the power quota of the mains grid system at moment t, $P_{pv}(t)$ is the power generation of the renewable energy power generation apparatus at moment t, and $P_{L1}(t)$ is the power consumption of the first electrical device at moment t; and the charge/discharge power of the second energy storage apparatus is calculated based on the formula $P_b'(t) = P_g(t) + P_{pv}(t) - P_{L1}(t) - P_{L2}(t)$, where $P_b'(t)$ is the charge/discharge power of the second energy storage apparatus at moment t, and $P_{L2}(t)$ is the power consumption of the second electrical device at moment t.

Optionally, the preset control mode of the system of all-DC power supply and storage for a building specifically includes: a constant-mains-power supply mode, an electricity demand response mode, and a minimum electricity cost mode;

the constant-mains-power supply mode is a mode in which the mains grid system supplies constant power;

the electricity demand response mode is a mode in which electricity demand of the first electrical device and the second electrical device is changed to satisfy the power quota of the mains grid system; and the minimum electricity cost mode is a mode in which the total electricity cost is minimized under the premise of satisfying load electricity demand by adjusting the charge/discharge power of the first and second energy storage apparatuses.

According to specific examples provided by the present invention, the present invention discloses the following technical effects.

The present invention provides a system and control method of all-DC power supply and storage for a building. A first DC/DC conversion apparatus is disposed to convert DC voltage generated by a renewable energy power generation apparatus into voltage of a first voltage DC bus. An AC/DC conversion apparatus is disposed to convert AC power generated by a mains grid system into DC power. A first charge-discharge conversion apparatus is disposed to control charge/discharge of a first energy storage apparatus. In this way, DC power is directly supplied in the building. Therefore, a voltage regulator and rectifier apparatus are not required for each electrical device, which reduces hardware costs and eliminates power loss caused by AC-DC conversion. In addition, battery charging and discharging are adjusted to fully utilize renewable energy such as photovoltaic power and compensate for a difference between power generation and power consumption. Arranging a power storage device in the building not only helps fully utilize local renewable energy, but also helps respond to electricity demand. It has the following important social benefits and huge economic value: improving the peak-load shifting capability of a power grid, reducing peak loads, reducing the installed capacity and investment of the power grid, improving a load factor of a power plant and that of the power grid in a trough period, improving power generation efficiency, and reducing energy waste.

BRIEF DESCRIPTION OF THE DRAWINGS

To describe the technical solutions in the examples of the present invention or in the prior art more clearly, the following briefly describes the accompanying drawings required for the examples. Apparently, the accompanying drawings in the following description show merely some examples of the present invention, and a person of ordinary skill in the art may still derive other accompanying drawings from these accompanying drawings without creative efforts.

DETAILED DESCRIPTION

The following clearly and completely describes the technical solutions in the examples of the present invention with reference to accompanying drawings in the examples of the present invention. Apparently, the described examples are merely a part rather than all of the examples of the present invention. All other examples obtained by a person of ordinary skill in the art based on the examples of the present invention without creative efforts shall fall within the protection scope of the present invention.

The objective of the present invention is to provide a system and control method of all-DC power supply and storage for a building. The present invention can improve power distribution efficiency and allow local renewable energy to be fully utilized.

In order to make the above objectives, features, and advantages of the present invention more understandable, the present invention will be described in further detail below with reference to the accompanying drawings and detailed examples.

Example 1

Figure 1:
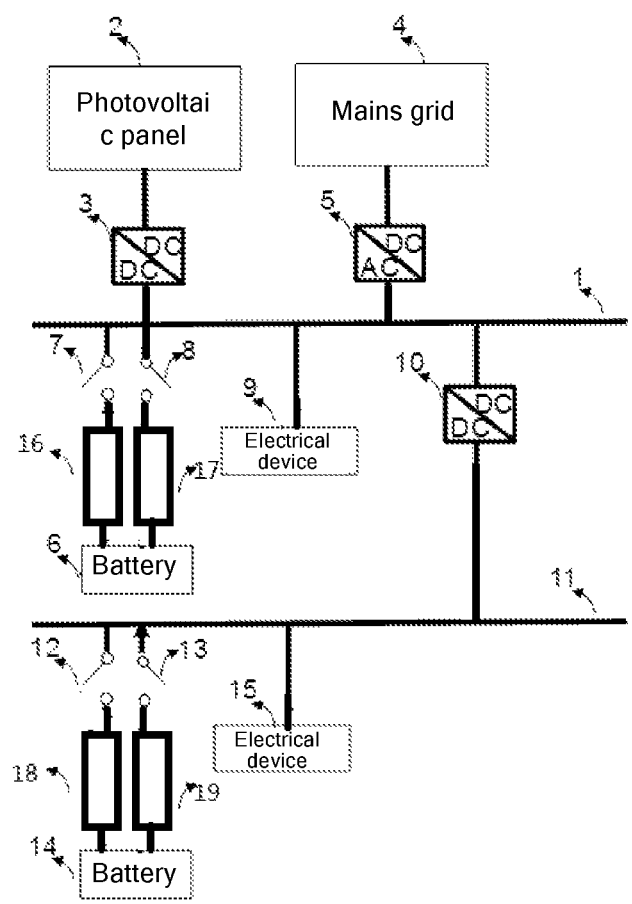
FIG. 1 is a structural connection diagram of a system of all-DC power supply and storage for a building according to Example 1 of the present invention.

FIG. 1 is a structural connection diagram of a system of all-DC power supply and storage for a building according to an example of the present invention. As shown in FIG. 1, the system of all-DC power supply and storage for a building includes a renewable energy power generation apparatus 2, a mains grid system 4, a first DC/DC conversion apparatus 3, an AC/DC conversion apparatus 5, a first voltage DC bus 1, a first energy storage apparatus 6, a first charge-discharge conversion apparatus, a second DC/DC conversion apparatus 10, a second voltage DC bus 11, a second energy storage apparatus 14, and a second charge-discharge conversion apparatus.

An input end of the first DC/DC conversion apparatus 3 is connected to an output end of the renewable energy power generation apparatus 2. An output end of the first DC/DC conversion apparatus 3 is connected to the first voltage DC bus 1. The first DC/DC conversion apparatus 3 is configured to convert DC voltage generated by the renewable energy power generation apparatus 2 into voltage of the first voltage DC bus 1. The renewable energy power generation apparatus 2 is one or more of a photovoltaic power generation apparatus and a wind power generation apparatus.

An input end of the AC/DC conversion apparatus 5 is connected to the mains grid system 4. An output end of the AC/DC conversion apparatus 5 is connected to the first voltage DC bus 1. The AC/DC conversion apparatus 5 is configured to convert AC power from the mains grid system to DC power to power a DC electrical device. The AC/DC conversion apparatus 5 is configured to change output voltage and adjust input power of the mains grid system. The AC/DC conversion apparatus 5 is configured to invert electric energy from a system of all-DC power supply and distributed storage for a building to AC power, and return the AC power to the mains grid system. The AC/DC conversion apparatus 5 connects the system of all-DC power supply and distributed storage for a building in an isolated manner. The system of all-DC power supply and distributed storage for a building is not directly connected to the mains grid. The AC/DC conversion apparatus 5 can switch to DC/DC conversion mode when the mains grid supplies DC power.

The first charge-discharge conversion apparatus includes a first switch 7, a second switch 8, a first step-up circuit 16, and a first step-down circuit 17. One end of the first switch 7 is connected to the first voltage DC bus 1. The other end of the first switch 7 is connected to one end of the first step-up circuit 16. The other end of the first step-up circuit 16 is connected to the first energy storage apparatus 6. One end of the second switch 8 is connected to the first voltage DC bus 1. The other end of the second switch 8 is connected to one end of the first step-down circuit 17. The other end of the first step-down circuit 17 is connected to the first energy storage apparatus 6. The first step-up circuit 16 is a boost circuit. The first step-down circuit 17 is a buck circuit. If voltage of the first energy storage apparatus 6 is lower than voltage of the first voltage DC bus 1, the first step-down circuit 17 is switched on during charging, and the first step-up circuit 16 is switched on during discharging. If voltage of the first energy storage apparatus 6 is higher than voltage of the first voltage DC bus 1, the first step-up circuit 16 is switched on during charging, and the first step-down circuit 17 is switched on during discharging. After the first switch 7, the second switch 8, the first step-up circuit 16, and the first step-down circuit 17 are disposed, renewable power can be fully utilized, and peak-load shifting can be implemented for mains power consumption. The first energy storage apparatus 6 is a battery.

The first voltage DC bus 1 is connected to a first electrical device 9 and configured to power the first electrical device 9. A voltage class of the first voltage DC bus 1 corresponds to a voltage class of the first electrical device 9.

An input end of the second DC/DC conversion apparatus 10 is connected to the first voltage DC bus 1. An output end of the second DC/DC conversion apparatus 10 is connected to the second voltage DC bus 11. The second DC/DC conversion apparatus 10 is configured to change DC voltage to power electrical devices having different voltage requirements.

The second charge-discharge conversion apparatus includes a third switch 12, a fourth switch 13, a second step-up circuit 18, and a second step-down circuit 19. One end of the third switch 12 is connected to the second voltage DC bus 11. The other end of the third switch 12 is connected to one end of the second step-up circuit 18. The other end of the second step-up circuit 18 is connected to the second energy storage apparatus 14. One end of the fourth switch 13 is connected to the second voltage DC bus 11. The other end of the fourth switch 13 is connected to one end of the second step-down circuit 19. The other end of the second step-down circuit 19 is connected to the second energy storage apparatus 14. The second step-up voltage 18 is a boost circuit. The second step-down circuit 19 is a buck circuit. If voltage of the second energy storage apparatus 14 is lower than voltage of the second voltage DC bus 11, the second step-down circuit 19 is switched on during charging, and the second step-up circuit 18 is switched on during discharging. If voltage of the second energy storage apparatus 14 is higher than voltage of the second voltage DC bus 11, the second step-up circuit 18 is switched on during charging, and the second step-down circuit 19 is switched on during discharging. After the third switch 12, the fourth switch 13, the second step-up circuit 18, and the second step-down circuit 19 are disposed, renewable power can be fully utilized, and peak-load shifting can be implemented for mains power consumption. The second energy storage apparatus 14 is a battery.

The second voltage DC bus 11 is connected to a second electrical device 15 and configured to power the second electrical device 15. Rated voltage of the second electrical device 15 is lower than rated voltage of the first electrical device 9. A voltage class of the second voltage DC bus1 1 corresponds to a voltage class of the second electrical device 15.

According to the system of all-DC power supply and storage for a building provided in the present invention, DC power is directly supplied in the building. In this case, a voltage regulator and rectifier apparatus is not required for each electrical device, which reduces hardware costs and eliminates power loss caused by AC-DC conversion. In addition, battery charging and discharging are adjusted to fully utilize renewable energy such as photovoltaic power and compensate for a difference between power generation and power consumption. Arranging a power storage device in the building not only helps fully utilize local renewable energy, but also helps to achieve demand response. It has the following important social benefits and huge economic value: improving the peak-load shifting capability of a power grid, reducing peak loads, reducing the installed capacity and investment of the power grid, improving a load factor of a power plant and that of the power grid in a trough period, improving power generation efficiency, and reducing energy waste.

Example 2

Figure 2:
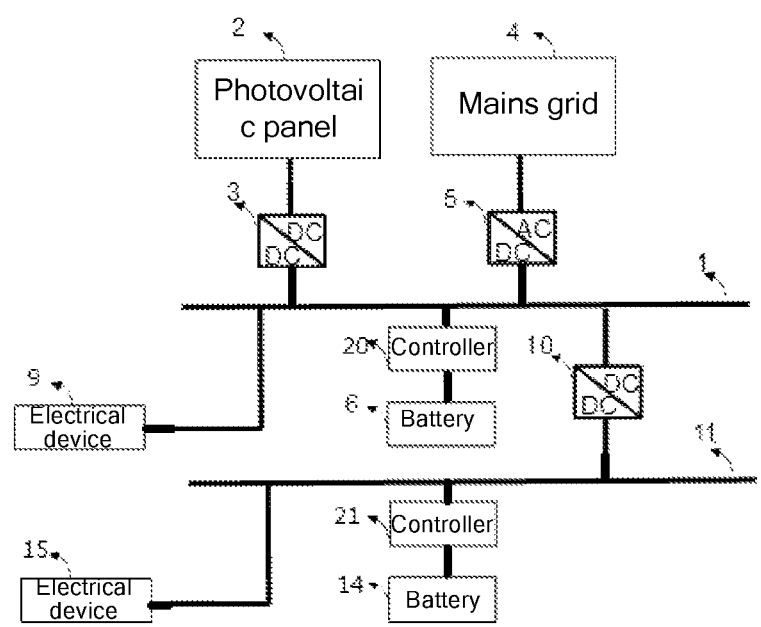
FIG. 2 is a structural connection diagram of a system of all-DC power supply and storage for a building according to Example 2 of the present invention.

FIG. 2 is a structural connection diagram of a system of all-DC power supply and storage for a building according to an example of the present invention. As shown in FIG. 2, the system of all-DC power supply and storage for a building includes a renewable energy power generation apparatus 2, a mains grid system 4, a first DC/DC conversion apparatus 3, an AC/DC conversion apparatus 5, a first voltage DC bus 1, a first energy storage apparatus 6, a first charge/discharge controller 20, a second DC/DC conversion apparatus 10, a second voltage DC bus 11, a second energy storage apparatus 14, and a second charge/discharge controller 21.

An input end of the first DC/DC conversion apparatus 3 is connected to an output end of the renewable energy power generation apparatus 2. An output end of the first DC/DC conversion apparatus 3 is connected to the first voltage DC bus 1. The first DC/DC conversion apparatus 3 is configured to convert DC voltage generated by the renewable energy power generation apparatus 2 into voltage of the first voltage DC bus. The renewable energy power generation apparatus 2 is one or more of a photovoltaic power generation apparatus and a wind power generation apparatus.

An input end of the AC/DC conversion apparatus 5 is connected to the mains grid system 4. An output end of the AC/DC conversion apparatus 5 is connected to the first voltage DC bus 1. The AC/DC conversion apparatus 5 is configured to convert AC power from the mains grid system to DC power to power a DC electrical device. The AC/DC conversion apparatus 5 is configured to change output voltage and adjust input power of the mains grid system. The AC/DC conversion apparatus 5 is configured to invert electric energy from a system of all-DC power supply and distributed storage for a building to AC power, and return the AC power to the mains grid system. The AC/DC conversion apparatus 5 connects the system of all-DC power supply and distributed storage for a building in an isolated mode. The system of all-DC power supply and distributed storage for a building is not directly connected to the mains grid. The AC/DC conversion apparatus 5 can switch to DC/DC conversion mode when the mains grid supplies DC power.

The first voltage DC bus 1 is connected to a first electrical device 9 and configured to power the first electrical device 9. A voltage class of the first voltage DC bus 1 corresponds to a voltage class of the first electrical device 9.

An input end of the second DC/DC conversion apparatus 10 is connected to the first voltage DC bus 1. An output end of the second DC/DC conversion apparatus 10 is connected to the second voltage DC bus 11. The second DC/DC conversion apparatus 10 is configured to change DC voltage to power electrical devices having different voltage requirements.

The second voltage DC bus 11 is connected to a second electrical device 15 and configured to power the second electrical device 15. Rated voltage of the second electrical device 15 is less than rated voltage of the first electrical device 9. A voltage class of the second voltage DC bus 11 corresponds to a voltage class of the second electrical device 15.

One end of the first charge/discharge controller 20 is connected to the first voltage DC bus 1, and the other end is connected to the first energy storage apparatus 6. The first charge/discharge controller 20 is configured to control charge/discharge of the first energy storage apparatus 6. One end of the second charge/discharge controller 21 is connected to the second voltage DC bus 11, and the other end is connected to the second energy storage apparatus 14. The second charge/discharge controller 21 is configured to control charge/discharge of the second energy storage apparatus 14. The first charge/discharge controller 20 and the second charge/discharge controller 21 adjust charge/discharge voltage of the energy storage apparatuses by using bidirectional boost/buck modules, thereby changing charge/discharge power of the energy storage apparatuses. Both the first energy storage apparatus 6 and the second energy storage apparatus 14 are batteries.

Figure 3:
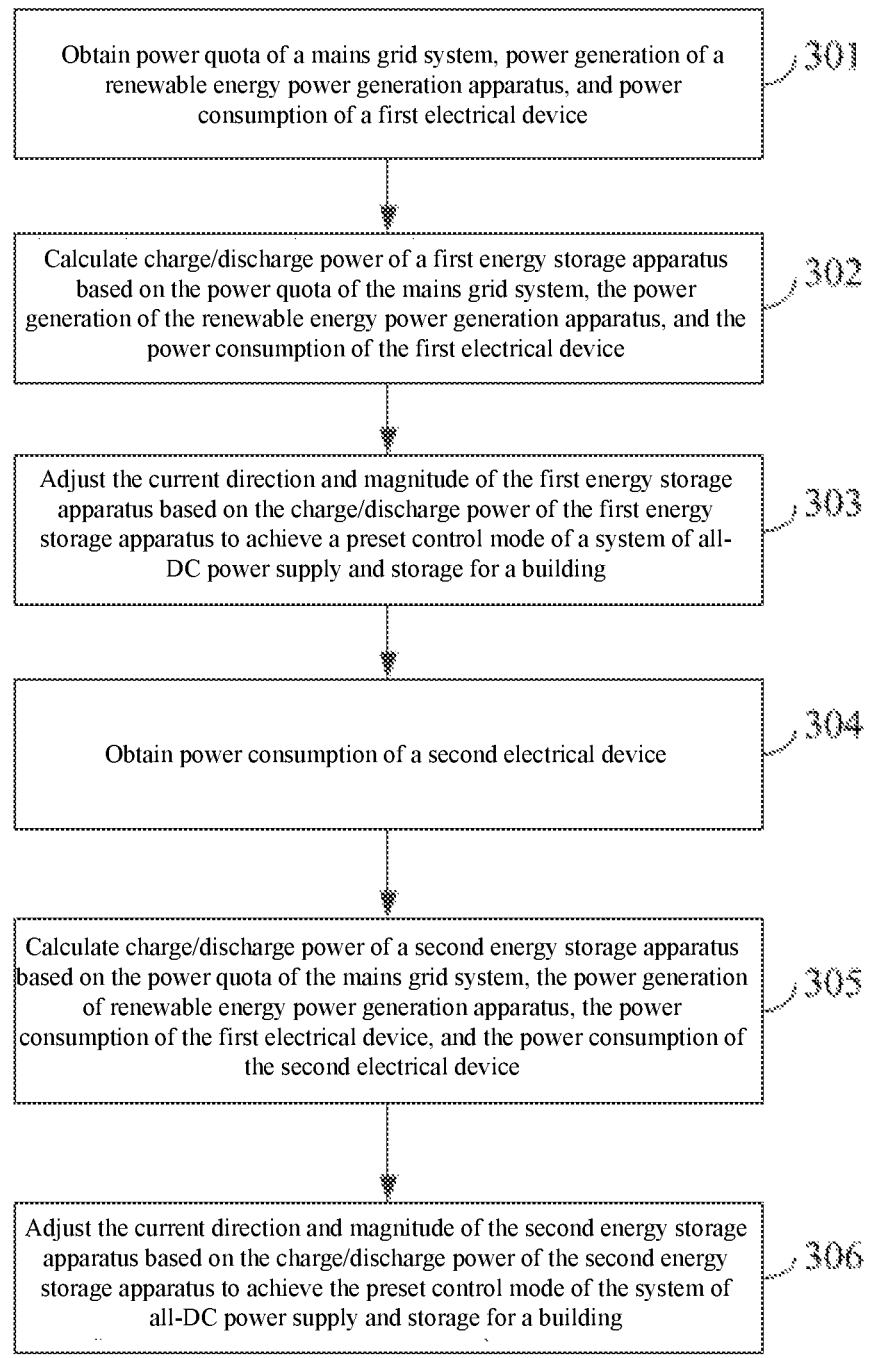
FIG. 3 is a flowchart of a control method of all-DC power supply and storage for a building according to Example 2 of the present invention.

FIG. 3 is a flowchart of a control method of all-DC power supply and storage for a building according to an example of the present invention. As shown in FIG. 3, the control method of all-DC power supply and storage for a building includes the following steps:

Step 301: the first charge/discharge controller 20 obtains power quota of the mains grid system, power generation of the renewable energy power generation apparatus, and power consumption of the first electrical device.

Step 302: the first charge/discharge controller 20 calculates charge/discharge power of the first energy storage apparatus based on the power quota of the mains grid system, the power generation of the renewable energy power generation apparatus, and the power consumption of the first electrical device.

The charge/discharge power of the first energy storage apparatus is calculated based on the formula $P_b(t)=P_g(t)+P_{pv}(t)-P_{L1}(t)$.

In the formula, $P_b(t)$ is the charge/discharge power of the first energy storage apparatus at moment t, $P_g(t)$ is the power quota of the mains grid system at moment t, $P_{pv}(t)$ is the power generation of the renewable energy power generation apparatus at moment t, and $P_{L1}(t)$ is the power consumption of the first electrical device at moment t.

Step 303: the first charge/discharge controller 20 adjusts the current direction and magnitude of the first energy storage apparatus based on the charge/discharge power of the first energy storage apparatus to achieve a preset control mode of the system of all-DC power supply and storage for a building.

Step 304: the second charge/discharge controller 21 obtains power consumption of the second electrical device.

Step 305: the second charge/discharge controller 21 calculates charge/discharge power of the second energy storage apparatus based on the power quota of the mains grid system, the power generation of renewable energy power generation apparatus, the power consumption of the first electrical device, and the power consumption of the second electrical device.

The charge/discharge power of the second energy storage apparatus is calculated based on the formula $P_b'(t)=P_g(t)+P_{pv}(t)-P_{L1}(t)-P_{L2}(t)$.

In the formula, $P_b'(t)$ is the charge/discharge power of the second energy storage apparatus at moment t, and $P^{L2}(t)$ is the power consumption of the second electrical device at moment t.

Step 306: the second charge/discharge controller 21 adjusts the current direction and magnitude of the second energy storage apparatus based on the charge/discharge power of the second energy storage apparatus to achieve the preset control mode of the system of all-DC power supply and storage for a building.

The preset control mode of the system of all-DC power supply and storage for a building in step 303 and step 306 includes constant-mains-power supply mode M1, electricity demand response mode M2, and minimum electricity cost mode M3.

The constant-mains-power supply mode M1 is a mode in which the mains grid system supplies constant power. Battery charge/discharge power is controlled to compensate for electrical load fluctuation, so that power of the mains grid is constant. This implements electricity peak-load shifting, and eliminates a peak-trough difference.

In the constant-mains-power supply mode M1, a method for determining the battery charge/discharge power is as follows:

$$P_b(t)=P_g(t)+P_{pv}(t)-P_L(t)$$

In the formula, $P_b(t)$ is the battery charge/discharge power (kW) at moment t, where a positive value indicates charging, and a negative value indicates discharging; $P_g$ is the power (kW) of the mains grid system; $P_{pv}(t)$ is the power generation (kW) of the renewable energy power generation apparatus at moment t; and $P_L(t)$ is the power consumption (kW) of the electrical device at moment t.

The electricity demand response mode M2 is a mode in which the power of the mains grid system is changed to satisfy electricity demand of the first electrical device and the second electrical device. The power use of the mains grid is changed in response to a demand response signal of the mains grid for controlling power consumption on the demand side. The battery charge/discharge power is controlled to compensate for a mismatch between the power of the mains grid and electricity demand.

In the electricity demand response mode M2, a method for determining the battery charge/discharge power is as follows:

$$P_b(t)=P_g+P_{pv}(t)-P_L(t)$$

In the formula, $P_b(t)$ is the battery charge/discharge power (kW) at moment t, where a positive value indicates charging, and a negative value indicates discharging; $P_g$ is the power (kW) of the mains grid system; $P_{pv}(t)$ is the power generation (kW) of the renewable energy power generation apparatus at moment t; and $P_L(t)$ is the power consumption (kW) of the electrical device at moment t.

The minimum electricity cost mode M3 is a mode in which the total electricity cost is minimized under the premise of satisfying load electricity demand. The power of the mains grid and the battery charge/discharge power are controlled based on peak and trough prices of electricity. In this way, the total electricity cost is minimized under the premise of satisfying load electricity demand.

In the minimum electricity cost mode M3, a method for determining the battery charge/discharge power is as follows:

$$\min C = \sum_{t=1}^{24} p(t)P_g(t)$$

$$s.t. \begin{cases} P_g(t) = P_L(t) - P_{pv}(t) - P_b(t) \\ \int_1^{24} P_b(t)dt < Q_b \end{cases}$$

In the formula, C is a daily electricity cost (dollar); p(t) is the electricity price (dollar/kWh) of the mains grid system at moment t; $P_g(t)$ is the power (kW) of the mains grid system at moment t; $P_L(t)$ is the power consumption (kW) of the electrical device at moment t; $P_{pv}(t)$ is the power generation (kW) of the renewable energy power generation apparatus at moment t; and $P_b(t)$ is the battery charge/discharge power (kW) at moment t, where a positive value indicates charging, and a negative value indicates discharging; $Q_b$ is battery capacity, which is determined using the following formulas:

$$SOC(t) = \eta \int_0^t [P_g + P_{pv}(\xi) - P_L(\xi)]d\xi$$

$$Q_b = \max_{i=1}^{365}\left[\max_{t=1}^{24} SOC_i(t) - \min_{t=1}^{24} SOC_i(t)\right]$$

In the formula, SOC(t) is the state of charge (kWh) of the battery at moment t; η is charging efficiency; $P_g$ is the power of the mains grid; $P_p(\zeta)$ is the power generation (kW) of the renewable energy power generation apparatus at moment ζ; $P_L(\zeta)$ is the power consumption (kW) of the electrical device at moment ζ; is a day in a year, and i=1, 2, ..., 365; and t is a moment in a day, and t=1, 2, ..., 24.

According to the system of all-DC power supply and storage for a building provided in the present invention, DC power is directly supplied in the building. In this case, a voltage regulator and rectifier apparatus is not required for each electrical device, which reduces hardware costs and eliminates power loss caused by AC-DC conversion. In addition, battery charging and discharging are adjusted to fully utilize renewable energy such as photovoltaic power and compensate for a difference between power generation and power consumption. Arranging a power storage device in the building not only helps fully utilize local renewable energy, but also helps to achieve demand response. It has the following important social benefits and huge economic value: improving the peak-load shifting capability of a power grid, reducing peak loads, reducing the installed capacity and investment of the power grid, improving a load factor of a power plant and that of the power grid in a trough period, improving power generation efficiency, and reducing energy waste.

Examples 3

Figure 4:
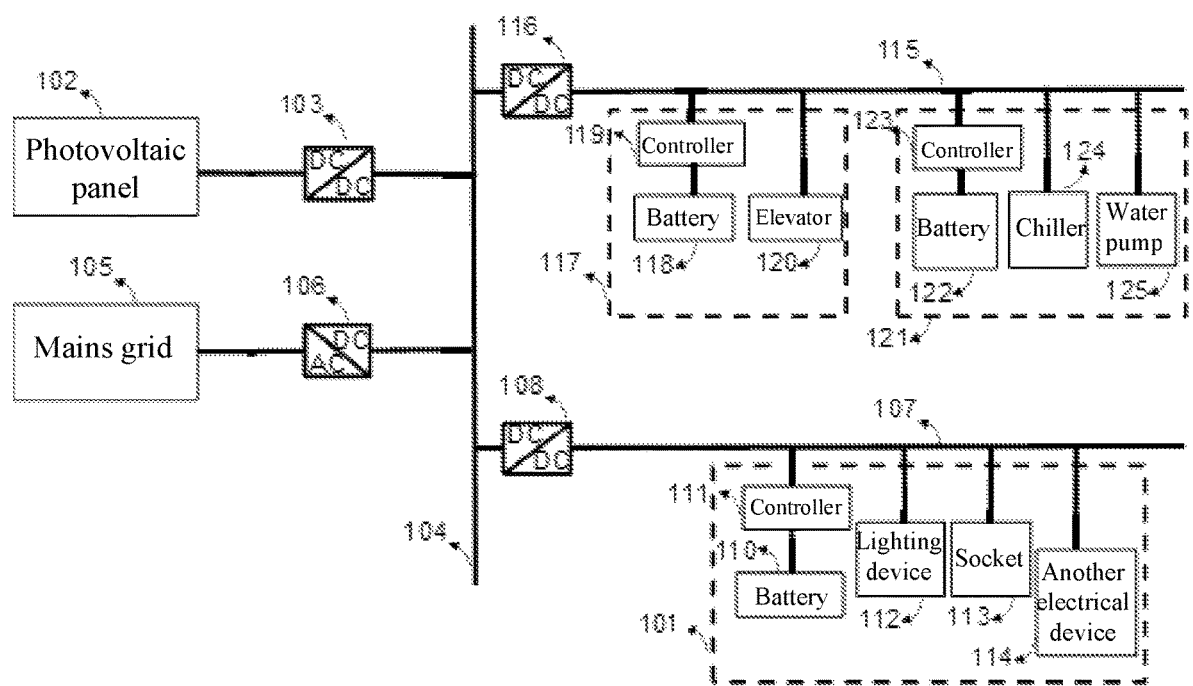
FIG. 4 is a structural connection diagram of a system of all-DC power supply and storage for a building according to Example 3 of the present invention.

FIG. 4 is a structural connection diagram of a system of all-DC power supply and storage for a building according to an example of the present invention. As shown in FIG. 4, the system of all-DC power supply and storage for a building includes a renewable energy power generation apparatus 102, a mains grid system 105, a first DC/DC conversion apparatus 103, an AC/DC conversion apparatus 106, a first voltage DC bus 104, a first energy storage apparatus 110, a first charge/discharge controller 111, a second DC/DC conversion apparatus 108, a second voltage DC bus 107, a second energy storage apparatus 118, a second charge/discharge controller 119, a third voltage DC bus 115, a third DC/DC conversion apparatus 116, a third energy storage apparatus 122, and a third charge/discharge controller 123.

An input end of the first DC/DC conversion apparatus 103 is connected to an output end of the renewable energy power generation apparatus 102. An output end of the first DC/DC conversion apparatus 3 is connected to the first voltage DC bus 104. The first DC/DC conversion apparatus 103 is configured to convert DC voltage generated by the renewable energy power generation apparatus 102 into voltage of the first voltage DC bus. The renewable energy power generation apparatus 102 is one or more of a photovoltaic power generation apparatus and a wind power generation apparatus.

An input end of the AC/DC conversion apparatus 106 is connected to the mains grid system 105. An output end of the AC/DC conversion apparatus 106 is connected to the first voltage DC bus 104. The AC/DC conversion apparatus 106 is configured to convert AC power from the mains grid system to DC power to power a DC electrical device. The AC/DC conversion apparatus 106 is configured to change output voltage and adjust input power of the mains grid system. The AC/DC conversion apparatus 106 is configured to invert electric energy from a system of all-DC power supply and distributed storage for a building to AC power, and return the AC power to the mains grid system. The AC/DC conversion apparatus 106 connects the system of all-DC power supply and distributed storage for a building in an isolated mode. The system of all-DC power supply and distributed storage for a building is not directly connected to the mains grid. The AC/DC conversion apparatus 106 can switch to DC/DC conversion mode when the mains grid supplies DC power.

An input end of the second DC/DC conversion apparatus 108 is connected to the first voltage DC bus 104. An output end of the second DC/DC conversion apparatus 108 is connected to the second voltage DC bus 107. The second DC/DC conversion apparatus 108 is configured to change DC voltage to power electrical devices having different voltage requirements.

An input end of the third DC/DC conversion apparatus 116 is connected to the first voltage DC bus 104. An output end of the third DC/DC conversion apparatus 116 is connected to the third voltage DC bus 115. The third DC/DC conversion apparatus 116 is configured to change DC voltage to power electrical devices having different voltage requirements. A voltage class of the second voltage DC bus 107 is the same as a voltage class of the third voltage DC bus 115.

One end of the first charge/discharge controller 111 is connected to the second voltage DC bus 107, and the other end is connected to the first energy storage apparatus 110. The first charge/discharge controller 111 is configured to control charge/discharge of the first energy storage apparatus 110. One end of the second charge/discharge controller 119 is connected to the third voltage DC bus 115, and the other end is connected to the second energy storage apparatus 118. The second charge/discharge controller 119 is configured to control charge/discharge of the second energy storage apparatus 118. One end of the third charge/discharge controller 123 is connected to the third voltage DC bus 115, and the other end is connected to the third energy storage apparatus 122. The third charge/discharge controller 123 is configured to control charge/discharge of the third energy storage apparatus 122. The first charge/discharge controller 111, the second charge/discharge controller 119, and the third charge/discharge controller 123 adjust charge/discharge voltage of the energy storage apparatuses by using bidirectional boost/buck modules, thereby changing charge/discharge power of the energy storage apparatuses. The first energy storage apparatus 110, the second energy storage apparatus 118, and the third energy storage apparatus 122 are all batteries.

The second voltage DC bus 107 is connected to a lighting device 112, a socket 113, and another electrical device 114. The lighting device 112, the socket 113, the another electrical device 114, the first charge/discharge controller 111, and the first energy storage apparatus 110 are arranged in a room 101.

The third voltage DC bus 115 is connected to an elevator 120. The elevator 120, the second charge/discharge controller 119, and the second energy storage apparatus 118 are arranged in a first machine room 117.

The third voltage DC bus 115 is further connected to a chiller 124 and a water pump 125. The chiller 124, the water pump 125, the third charge/discharge controller 123, and the third energy storage apparatus 122 are arranged in a second machine room 121.

In this paper, several examples are used for illustration of the principles and implementations of the present invention. The description of the foregoing examples is used to help illustrate the method of the present invention and the core principles thereof. In addition, those of ordinary skill in the art can make various modifications in terms of specific implementations and scope of application in accordance with the teachings of the present invention. In conclusion, the content of the present specification shall not be construed as a limitation to the present invention.

The above examples are provided merely for the purpose of describing the present invention and are not intended to limit the scope of the present invention. The scope of the present invention is defined by the appended claims. Various equivalent replacements and modifications made without departing from the spirit and scope of the present invention should fall within the scope of the present invention.

What is claimed is:

1. A system of direct current (DC) power supply and storage for a building, comprising:
    a renewable energy power generation apparatus, a main grid system, a first DC/DC conversion apparatus, an alternating current (AC)/DC conversion apparatus, a first voltage DC bus, and a first power adjustment apparatus; wherein
    an input end of the first DC/DC conversion apparatus is connected to an output end of the renewable energy power generation apparatus, and an output end of the first DC/DC conversion apparatus is connected to the first voltage DC bus; and the first DC/DC conversion apparatus is configured to convert DC voltage generated by the renewable energy power generation apparatus into voltage of the first voltage DC bus;

an input end of the AC/DC conversion apparatus is connected to the main grid system, an output end of the AC/DC conversion apparatus is connected to the first voltage DC bus; and the AC/DC conversion apparatus is configured to convert AC power from the main grid system into DC power;

the first voltage DC bus is connected to a first electrical device and configured to power the first electrical device; and the first power adjustment apparatus is connected to the first voltage DC bus; the first power adjustment apparatus is configured to balance between power generation of the renewable energy power generation apparatus, power supply of the main grid system, and power consumption of the first electrical device; the first power adjustment apparatus comprises a first energy storage apparatus and a first charge-discharge conversion apparatus; one end of the first charge-discharge conversion apparatus is connected to the first voltage DC bus, and the other end is connected to the first energy storage apparatus; and the first charge-discharge conversion apparatus is configured to control charge/discharge of the first energy storage apparatus and adjust the current direction and magnitude of the first energy storage apparatus based on the charge/discharge power of the first energy storage apparatus to achieve a preset control mode of a system of all-DC power supply and storage for a building, wherein the preset control mode of the system of all-DC power supply and storage for a building comprises: a constant-main-power supply mode, an electricity demand response mode, and a minimum electricity cost mode, the constant-main-power supply mode is a mode in which the main grid system supplies constant power, the electricity demand response mode is a mode in which electricity demand of the first electrical device and the second electrical device is changed to satisfy a power quota of the main grid system, and the minimum electricity cost mode is a mode in which a total electricity cost is minimized under the premise of satisfying load electricity demand.

2. The system of DC power supply and storage for a building according to claim 1, further comprising:

a second DC/DC conversion apparatus, a second voltage DC bus, and a plurality of second power adjustment apparatuses;

an input end of the second DC/DC conversion apparatus is connected to the first voltage DC bus, an output end of the second DC/DC conversion apparatus is connected to the second voltage DC bus, and the second DC/DC conversion apparatus is configured to convert DC voltage;

the second voltage DC bus is connected to a second electrical device and configured to power the second electrical device; and rated voltage of the second electrical device is lower than rated voltage of the first electrical device; and each second power adjustment apparatus of the plurality of second power adjustment apparatuses is connected to the second voltage DC bus; each second power adjustment apparatus is configured to adjust a balance between the power generation of the renewable energy power generation apparatus, the power supply of the main grid system, the power consumption of the first electrical device, and power consumption of the second electrical device; each second power adjustment apparatus comprises a second energy storage apparatus and a second charge-discharge conversion apparatus; an input end of the second charge-discharge conversion apparatus is connected to the second voltage DC bus, and an output end of the second charge-discharge conversion apparatus is connected to the second energy storage apparatus; and the second charge-discharge conversion apparatus is configured to control charge/discharge of the second energy storage apparatus.

3. The system of DC power supply and storage for a building according to claim 2, wherein the first charge-discharge conversion apparatus comprises a first switch, a second switch, a first step-up circuit, and a first step-down circuit; one end of the first switch is connected to the first voltage DC bus, the other end of the first switch is connected to one end of the first step-up circuit, and the other end of the first step-up circuit is connected to the first energy storage apparatus; and one end of the second switch is connected to the first voltage DC bus, the other end of the second switch is connected to one end of the first step-down circuit, and the other end of the first step-down circuit is connected to the first energy storage apparatus;

the second charge-discharge conversion apparatus comprises a third switch, a fourth switch, a second step-up circuit, and a second step-down circuit; one end of the third switch is connected to the second voltage DC bus, the other end of the third switch is connected to one end of the second step-up circuit, and the other end of the second step-up circuit is connected to the second energy storage apparatus; and one end of the fourth switch is connected to the second voltage DC bus, the other end of the fourth switch is connected to one end of the second step-down circuit, and the other end of the second step-down circuit is connected to the second energy storage apparatus; and both the first step-up circuit and the second step-up circuit are boost circuits; and both the first step-down circuit and the second step-down circuit are buck circuits.

4. The system of DC power supply and storage for a building according to claim 2, wherein both the first charge-discharge conversion apparatus and the second charge-discharge conversion apparatus are charge-discharge controllers.

5. The system of DC power supply and storage system for a building according to claim 2, wherein both the first energy storage apparatus and the second energy storage apparatus are batteries.

6. The system of DC power supply and storage system for a building according to claim 3, wherein both the first energy storage apparatus and the second energy storage apparatus are batteries.

7. The system of DC power supply and storage system for a building according to claim 4, wherein both the first energy storage apparatus and the second energy storage apparatus are batteries.

8. The system of DC power supply and storage for a building according to claim 2, wherein there is one or more first power adjustment apparatuses; and when there are a plurality of first power adjustment apparatuses, the first power adjustment apparatuses are distributed inside the building based on building space and a position in which the first electrical device is arranged;

and each of the second power adjustment apparatuses are distributed inside the building based on building space and positions in which the first electrical device and the second electrical device are arranged; and the renewable energy power generation apparatus is one or more of a photovoltaic power generation apparatus and a wind power generation apparatus.

9. A control method of all-DC power supply and storage for a building, comprising:

obtaining power quota of a main grid system, power generation of a renewable energy power generation apparatus, and power consumption of a first electrical device;

calculating charge/discharge power of a first energy storage apparatus based on the power quota of the main grid system, the power generation of the renewable energy power generation apparatus, and the power consumption of the first electrical device; and adjusting the current direction and magnitude of the first energy storage apparatus based on the charge/discharge power of the first energy storage apparatus to achieve a preset control mode of a system of all-DC power supply and storage for a building, wherein the preset control mode of the system of all-DC power supply and storage for a building comprises: a constant-main-power supply mode, an electricity demand response mode, and a minimum electricity cost mode, the constant-main-power supply mode is a mode in which the main grid system supplies constant power, the electricity demand response mode is a mode in which electricity demand of the first electrical device and the second electrical device is changed to satisfy the power quota of the main grid system, and the minimum electricity cost mode is a mode in which a total electricity cost is minimized under the premise of satisfying load electricity demand.

10. The control method of all-DC power supply and storage for a building according to claim 9, further comprising:

obtaining power consumption of a second electrical device;

calculating charge/discharge power of a second energy storage apparatus based on the power quota of the main grid system, the power generation of the renewable energy power generation apparatus, the power consumption of the first electrical device, and the power consumption of the second electrical device; and adjusting the current direction and magnitude of the second energy storage apparatus based on the charge/discharge power of the second energy storage apparatus to achieve the preset control mode of the system of all-DC power supply and storage for a building.

11. The control method of all-DC power supply and storage for a building according to claim 10, wherein the charge/discharge power of the first energy storage apparatus is calculated based on the formula $P_b(t)=P_g(t)+P_{pv}(t)-P_{L1}(t)$, wherein $P_b(t)$ is the charge/discharge power of the first energy storage apparatus at moment t, $P_g(t)$ is the power quota of the main grid system at moment t, $P_{pv}(t)$ is the power generation of the renewable energy power generation apparatus at moment t, and $P_{L1}(t)$ is the power consumption of the first electrical device at moment t; and the charge/discharge power of the second energy storage apparatus is calculated based on the formula $P_b'(t)=P_g(t)+P_{pv}(t)-P_{L1}(t)-P_{L2}(t)$, wherein $P_b'(t)$ is the charge/discharge power of the second energy storage apparatus at moment t, and $P_{L2}(t)$ is the power consumption of the second electrical device at moment t.

* * * * *